(No Model.)
E. RUTZ.
FENCE POST.
No. 279,440. Patented June 12, 1883.
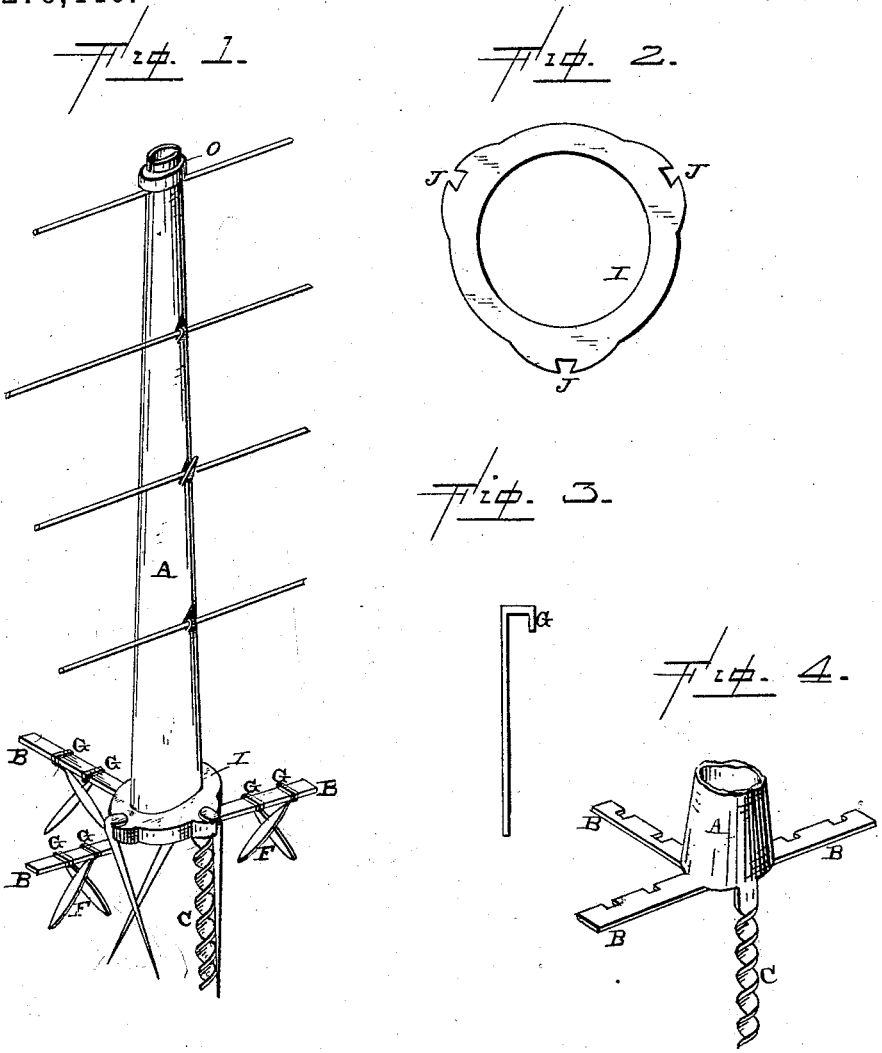

UNITED STATES PATENT OFFICE.

EDWARD RUTZ, OF SPRINGFIELD, ILLINOIS.

FENCE-POST.

SPECIFICATION forming part of Letters Patent No. 279,440, dated June 12, 1883.

Application filed April 30, 1883. (No model.)

*To all whom it may concern:*

Be it known that I, EDWARD RUTZ, of Springfield, in the county of Sangamon and State of Illinois, have invented certain new and useful Improvements in Fence-Posts; and I do hereby declare the following to be a full, clear, and exact description of the invention, such as will enable others skilled in the art to which it pertains to make and use it, reference being had to the accompanying drawings, which form part of this specification.

My invention relates to an improvement in metallic fence-posts; and it consists in the combination of a fence-post which has its lower end divided into a number of prongs, one of which is twisted into a screw, while the others form braces which rest upon the top of the ground, with a collar which is passed down over the post, and which is provided with grooves to receive fastening-stakes, and the stakes which hold the braces in position, as will be more fully described hereinafter.

The object of my invention is to provide a cheap and simple fence-post which is adapted to soils of all kinds, and which can be readily secured in position.

Figure 1 is a perspective of a post embodying my invention. Fig. 2 is a plan view of the collar which is passed down over the post. Fig. 3 is a detail view of the pin which is used to hold the braces in position. Fig. 4 is a perspective of the lower portion of the post alone.

A represents a fence-post, which may be made of either light iron or steel, and which is made conical in form. The lower end of this post is divided into any desired number of arms or braces, B, which are to rest upon the surface of the ground, and a single screw, C, which is to be forced into the ground in the usual manner. This screw is formed by bending one of the arms or braces into which the lower end of the post is divided into the form of a screw which will readily enter the ground when the post is turned around. I do not limit myself to any particular shape or form of the screw, for this may be made tapering, so as to be sharp-pointed, or it may be of the same width all the way down. After this screw has been forced into the earth, the braces B, which rest upon the top of the ground, and which have notches or recesses formed in either edge to receive the pins or stakes, are then fastened in position by having the pins or stakes F driven through the notches into the ground either in a vertical or an inclined position. Where two of these pins or stakes are used they will be driven in opposite directions, so as to cross each other, and thus take a firmer hold upon the ground. In order to enable these stakes to hold the arms or braces to the best advantage, the stakes are provided with a pronged head, G, which, when the stake is driven into the ground, catches upon or over the top of the brace, so as to lock it securely in place and prevent the brace from becoming detached from the stake. The lower portion of this stake will be flattened and widened, as shown, so as to give it a firmer hold upon the ground.

Passing down over the top of the post before the wires are attached thereto is a sleeve or collar, I, which has a number of diagonal grooves, J, formed in or upon its outer side. This collar will be strengthened upon each side of the groove, so as to prevent its being broken or weakened, and through these grooves will be driven suitable stakes of any kind, which will catch in the ground at the base of the post.

In fastening the wires to the post at the top I make a cut or recess upon opposite sides of the post and drop the top wire into these recesses, and then pass a ring, O, down over the top of the post to lock the wire in position. The other wires are fastened in place by making a triangular or other suitable shaped cut in the side of the post, bending this cut-out portion so as to allow the wire to be placed behind it, and then bending the cut-out portion down over the top of the wire in toward the center of the post.

Having thus described my invention, I claim—

The combination of the post A, having its lower end formed into the braces B, and the screw C, with a grooved collar, I, and the stakes which secure it in place, and the stakes G, which secure the braces in position, substantially as shown.

In testimony whereof I affix my signature in presence of two witnesses.

ED. RUTZ.

Witnesses:
J. W. GARNER,
F. A. LEHMAN.